Dec. 19, 1967   J. W. HAGS   3,358,894
STRIP GUIDE FOR A PINHOLE DETECTOR
Filed Dec. 10, 1965   2 Sheets-Sheet 1
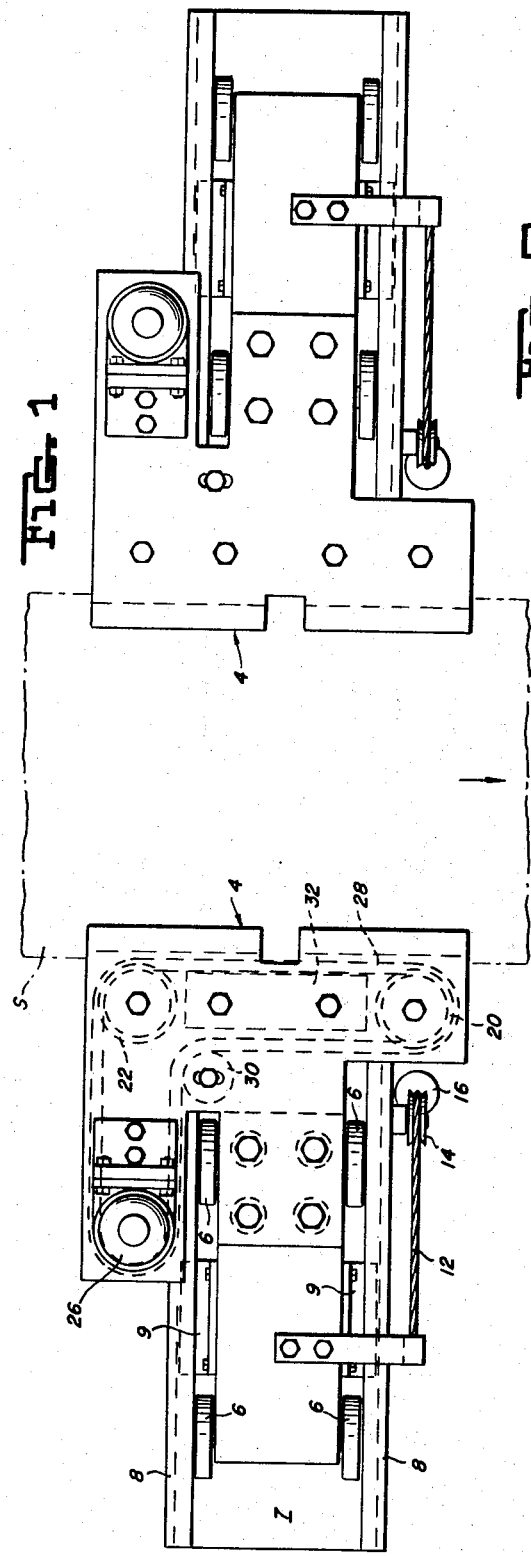
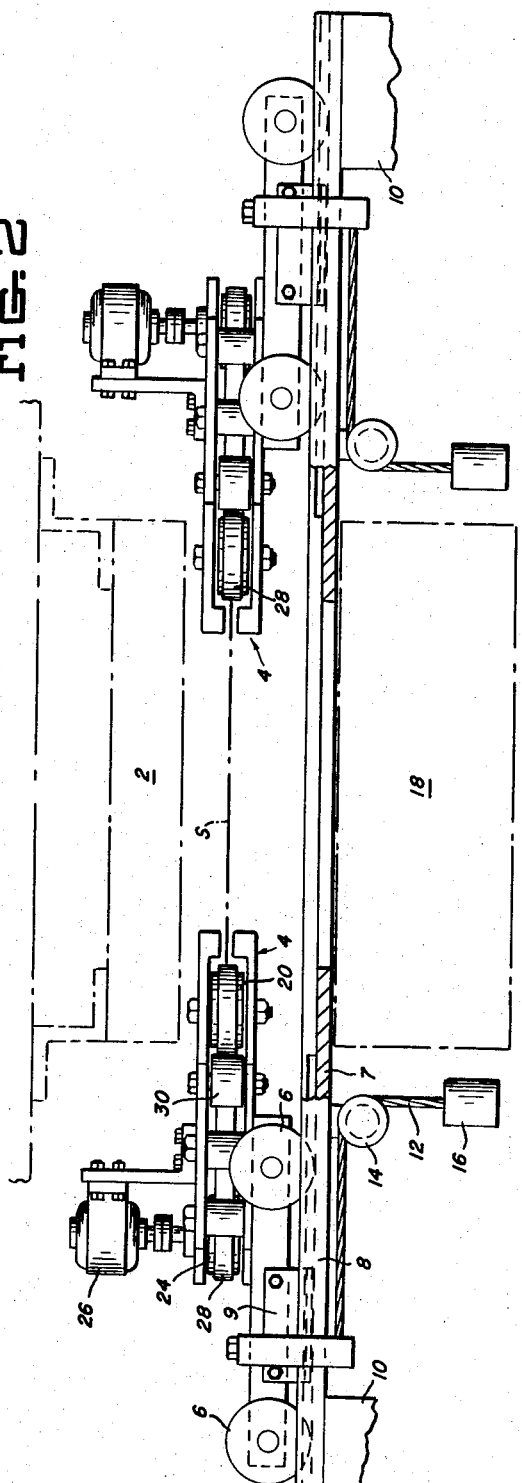
INVENTOR
JOSEPH W. HAGS
By Donald G. Dalton
Attorney Dec. 19, 1967    J. W. HAGS    3,358,894
STRIP GUIDE FOR A PINHOLE DETECTOR
Filed Dec. 10, 1965    2 Sheets-Sheet 2
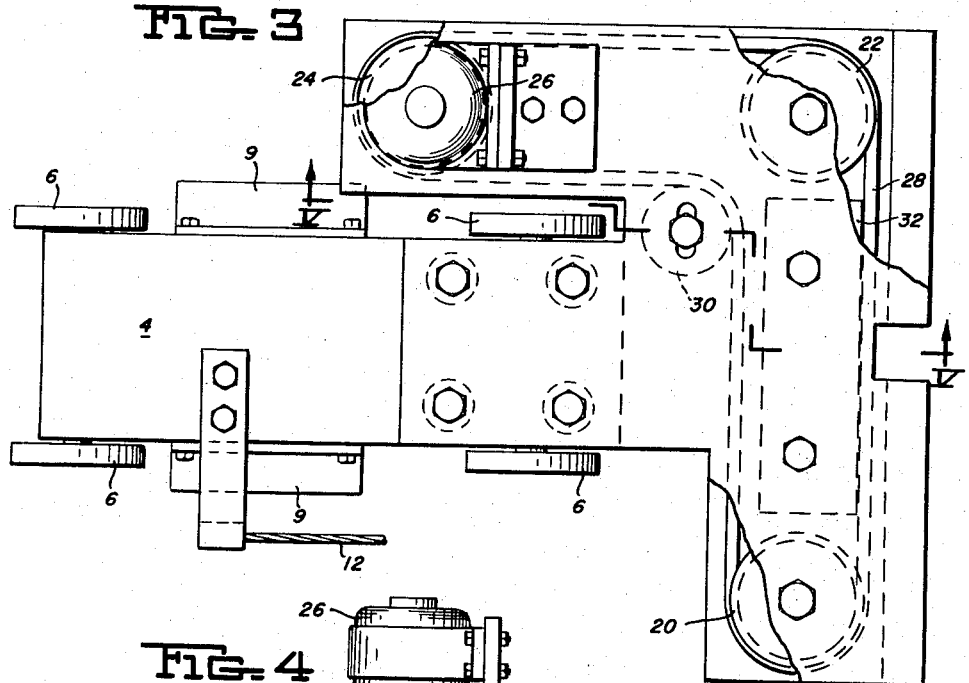
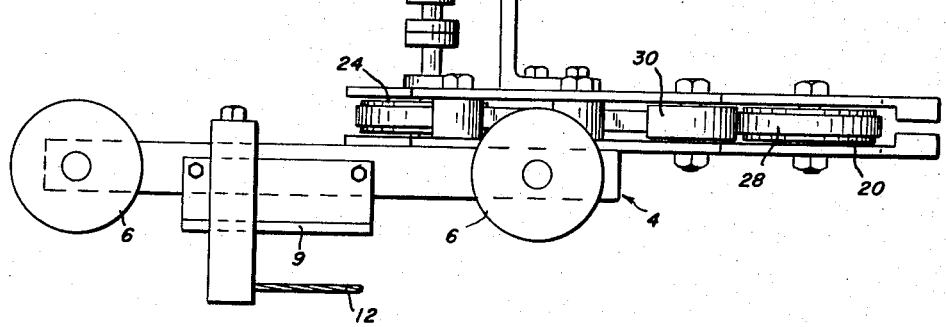
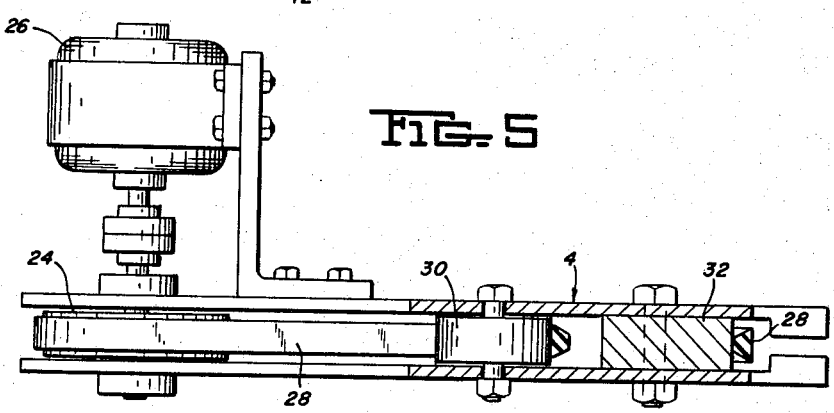
INVENTOR
JOSEPH W. HAGS
By Donald G. Dalton
Attorney

United States Patent Office 3,358,894
Patented Dec. 19, 1967

3,358,894
STRIP GUIDE FOR A PINHOLE DETECTOR
Joseph W. Hags, North Huntington Township, Westmoreland County, Pa., assignor to United States Steel Corporation, a corporation of New Jersey
Filed Dec. 10, 1965, Ser. No. 513,031
3 Claims. (Cl. 226—198)

ABSTRACT OF THE DISCLOSURE

Apparatus for guiding and shielding the edges of a strip passing through a pinhole detector having two opposed movable carriages on each of which are mounted three pulleys with peripheral grooves for receiving a belt which bears against the edge of the strip. One pulley is driven to move the belt at the same speed as the strip.

---

This invention relates to a strip guide for a pinhole detector and more particularly to a detector for use in detecting pinholes in continuous opaque strips such as black plate and tin plate. This type of apparatus is shown in my previous Patent No. 2,395,181 dated Feb. 19, 1946, and in Camp Patent No. 2,886,716 dated May 12, 1959. To prevent improper operation of the pinhole detector, edge guides and shields have been provided with the edge guides and shields being mounted on opposed movable carriages. Numerous devices have been tried as light shields and found unsatisfactory. Such devices include blocks of metal, wood, felt and brushes. The cutting action of the edge of the strip causes these devices to wear quickly since the shields are stationary and the strip is moving rapidly. Also, the light shields of the previous devices have been slotted to overlap the edge of the strip to prevent light leakage. This prevents the pinhole detector from scanning the outside edges of the strip to the extent that they are covered by the overlap.

It is therefore an object of my invention to provide a strip guide and shield where the wear thereon is reduced by causing the shield to move in the same direction and speed as the strip.

Another object is to provide such a strip guide in which the light shield does not overlap the edge of the strip so that the entire strip can be scanned for pinholes.

These and other objects will be more apparent after referring to the following specification and atached drawings, in which:

FIGURE 1 is a top plan view of the detector showing the strip guide in position;

FIGURE 2 is a side view of the apparatus of FIGURE 1;

FIGURE 3 is an enlarged plan view of one of the carriages incorporating my invention therein with parts broken away;

FIGURE 4 is a side view of FIGURE 3; and

FIGURE 5 is a view taken on line V—V of FIGURE 3.

Referring more particularly to the drawings, reference numeral 2 indicates a light source mounted above a pair of carriages 4. One carriage 4 is mounted on each side of the path of travel of a strip S which is being inspected. Each carriage 4 includes four rotatable wheels 6 which are supported on platform 7 between U-shaped guides 8. Brackets 9 carried by each carriage 4 extend into the openings of guides 8 so as to prevent the carriages from tilting. The platform 7 is mounted on a support 10. One end of a rope 12 is connected to each carriage 4. The rope 12 passes around a pulley 14 and has a weight 16 mounted on its free end so as to urge the carriages 4 toward one another. A light detector 18, which may be a photocell or series of photocells of any conventional type, is located below the carriages 4 in alignment with light source 2. The parts so far described are conventional and their construction may vary and may include other features such as shown in the above mentioned patents.

According to my invention I provide two grooved pulleys 20 and 22 which are mounted on each carriage 4 with their axes vertical and in a plane parallel to the adjacent edge of the strip S. A third grooved pulley 24 is mounted on each carriage 4 rearwardly of the pulley 22 with its axis parallel to the axes of pulleys 20 and 22. A variable speed motor 26 is connected to drive the pulley 24. An endless belt 28 is received in the grooves of the pulleys 20, 22 and 24. It is preferred to provide another pulley 30, which need not be grooved, adjacent the pulley 22 so as to provide more wrap of the belt around pulleys 20 and 24. The pulley 30 may also be mounted for horizontal movement to permit tightening of belt 28. The belt 28 may be made from rubber, metal or a combination of any flexible and hard face materials. A back-up block 32 is also supported on each carriage 4 between the pulleys 20 and 22. The block 32 may be made of any low friction material such as carbon, lubricant impregnated metal, or teflon and bears against the back of the belt 28 so as to hold the belt against the edge of the strip S. Vertical rollers may be substituted for the block 32.

In operation, the block 32 is adjusted to provide the necessary pressure against the belt 28 and the motor 26 is operated at a speed which will cause the belt 28 to move in the direction of strip travel at a speed approximately equal to that of the strip. Since the belt and strip move at substantially the same speed there will be little if any cutting action by the strip against the surface of the belt. Since the light shield does not overlap the edge of the strip the detector can detect pinholes to the edge of the strip and the seal between the edge of the strip and the belt 28 is sufficiently tight to prevent light leakage.

While one embodiment of my invention has been shown and described, it will be apparent that other adaptations and modifications may be made without departing from the scope of the following claims.

I claim:

1. Apparatus for guiding and shielding the edges of a strip passing through a pinhole detector or the like comprising a support, a pair of carriages mounted on said support for movement with respect to one another transversely of the strip, means for urging said carriages inwardly toward each other, an endless belt on each of said carriages movable parallel to the adjacent edge of the strip and adapted to engage said edge, two pulleys mounted on each carriage and arranged on vertical axes in a plane parallel to the adjacent strip edge, and a third pulley mounted on each carriage rearwardly of the said two pulleys with its axis parallel to the axes of the said two pulleys, said pulleys having peripheral grooves for receiving said belt, and a motor mounted on each carriage for driving said third pulley.

2. Apparatus according to claim 1 including means mounted on each carriage bearing against the back of the belt between the said two pulleys to hold said belt against the edge of the strip.

3. Apparatus according to claim 2 in which said last named means includes a block made of a low friction material.

References Cited

UNITED STATES PATENTS 2,114,716   4/1938   Kunzle _____ 226—172 X
2,857,158   10/1958  Ungerer _____ 226—172

ALLEN N. KNOWLES, *Primary Examiner.*